United States Patent
Hognaland

(10) Patent No.: US 11,235,927 B2
(45) Date of Patent: Feb. 1, 2022

(54) BIN HOLDING DEVICE

(71) Applicant: Autostore Technology AS, Nedre Vats (NO)

(72) Inventor: Ingvar Hognaland, Nedre Vats (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 16/755,052

(22) PCT Filed: Aug. 27, 2018

(86) PCT No.: PCT/EP2018/072965
§ 371 (c)(1),
(2) Date: Apr. 9, 2020

(87) PCT Pub. No.: WO2019/076516
PCT Pub. Date: Apr. 25, 2019

(65) Prior Publication Data
US 2021/0188545 A1   Jun. 24, 2021

(30) Foreign Application Priority Data

Oct. 20, 2017 (NO) .................................. 20171688

(51) Int. Cl.
*B65G 1/04* (2006.01)
(52) U.S. Cl.
CPC ......... *B65G 1/0464* (2013.01); *B65G 1/0478* (2013.01)
(58) Field of Classification Search
CPC ...... B65G 1/0464; B65G 1/0478; B65G 1/14; B65G 1/12; B65G 1/0485; B65G 1/06;
(Continued)

(56) References Cited

U.S. PATENT DOCUMENTS 2,445,958 A * 7/1948 Lindstrom ........... B65G 59/101
                                                              221/223
3,034,684 A * 5/1962 Jackson ............... B65G 59/062
                                                              221/251
(Continued)

FOREIGN PATENT DOCUMENTS

DE     19849391 C2    2/2002
EP      1270453 A1    1/2003
(Continued)

OTHER PUBLICATIONS

International Search Report issued in PCT/EP2018/072965 dated Dec. 21, 2018 (6 pages).
(Continued)

*Primary Examiner* — Glenn F Myers
(74) *Attorney, Agent, or Firm* — Osha Bergman Watanabe & Burton LLP

(57) ABSTRACT

A bin holding device includes two vertical side elements spaced to accommodate a storage bin between the two vertical side elements. Each side element is provided with a bin supporting assembly including a bin support and an actuator. The bin support includes an upper bin interacting part arranged to interact with the storage bin when the storage bin is accommodated in the bin holding device, such that a top edge of the accommodated storage bin is held at a predetermined level. The actuator is operably connected to the bin support and includes a lower bin interacting part arranged to interact with the storage bin during introduction of the storage bin into the bin holding device in a downward vertical direction, such that the upper bin interacting part is moved to interact with the storage bin.

16 Claims, 9 Drawing Sheets

(58) Field of Classification Search
CPC .......... B65G 1/07; B65G 1/08; B65G 59/062; B65G 59/063; B65G 59/101; B65G 59/105; B65G 57/302; B65G 57/02; B65G 57/03; B65G 47/88
See application file for complete search history.

(56) References Cited

U.S. PATENT DOCUMENTS

| | | | | |
|---|---|---|---|---|
| 3,231,103 | A * | 1/1966 | Tantlinger | B65G 1/14 |
| | | | | 211/49.1 |
| 4,712,691 | A | 12/1987 | Grill et al. | |
| 4,909,697 | A | 3/1990 | Bernard, II et al. | |
| 8,864,437 | B1 * | 10/2014 | Flaming | B65H 29/46 |
| | | | | 414/788.2 |
| 10,059,521 | B2 * | 8/2018 | Swoboda | B65G 59/101 |
| 2013/0181586 | A1 * | 7/2013 | Hognaland | A47F 5/025 |
| | | | | 312/267 |
| 2017/0029169 | A1 | 2/2017 | Shamp et al. | |
| 2017/0217684 | A1 | 8/2017 | Swoboda | |

FOREIGN PATENT DOCUMENTS

| | | |
|---|---|---|
| EP | 2982624 A1 | 2/2016 |
| KR | 2000 0020336 U | 12/2000 |
| NO | 317366 B1 | 10/2004 |
| WO | 2012/026824 A1 | 3/2012 |
| WO | 2013/033743 A1 | 3/2013 |
| WO | 2014/090684 A1 | 6/2014 |
| WO | 2014/203126 A1 | 12/2014 |

OTHER PUBLICATIONS

Written Opinion of the International Searching Authority issued in PCT/EP2018/072965 dated Dec. 21, 2018 (7 pages).
Written Opinion of the International Preliminary Examining Authority issued in PCT/EP2018/072965 dated Oct. 9, 2019 (6 pages).
International Preliminary Report on Patentability from PCT/EP2018/072965 dated Feb. 20, 2020 (14 pages).
Norwegian Search Report issued in No. 20171688 dated May 18, 2018 (2 pages).

* cited by examiner

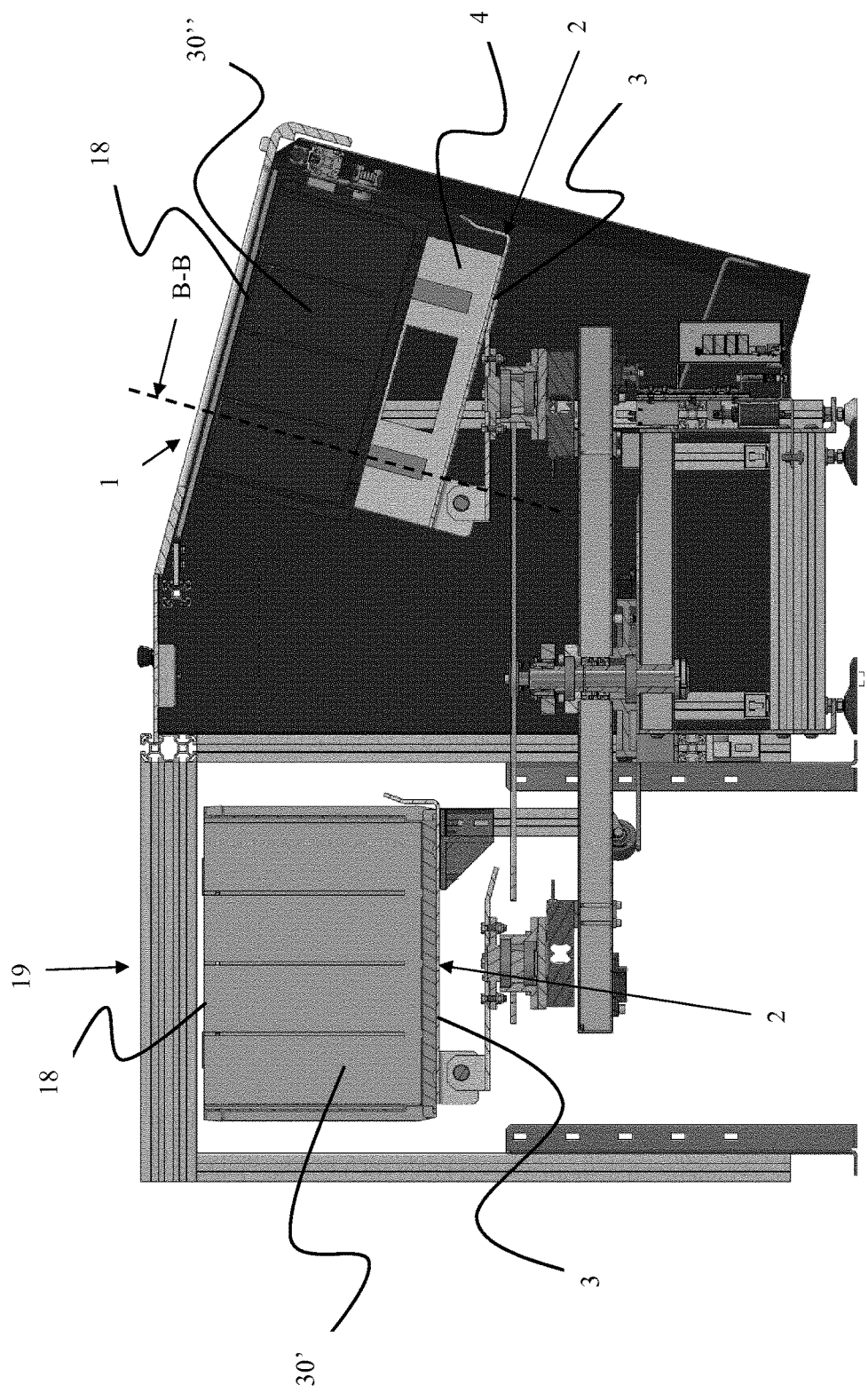
Fig. 3 (A-A)

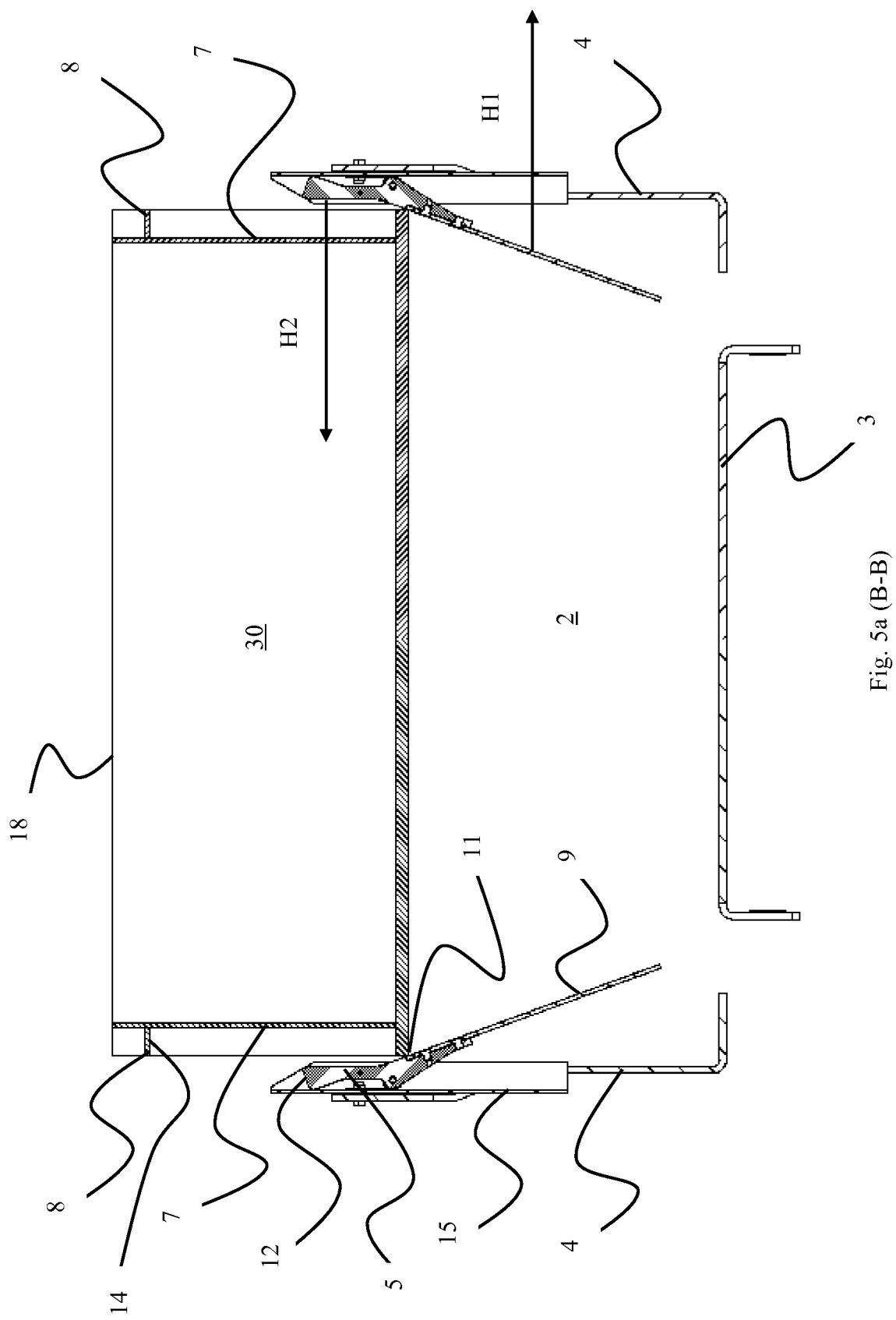
Fig. 5a (B-B)

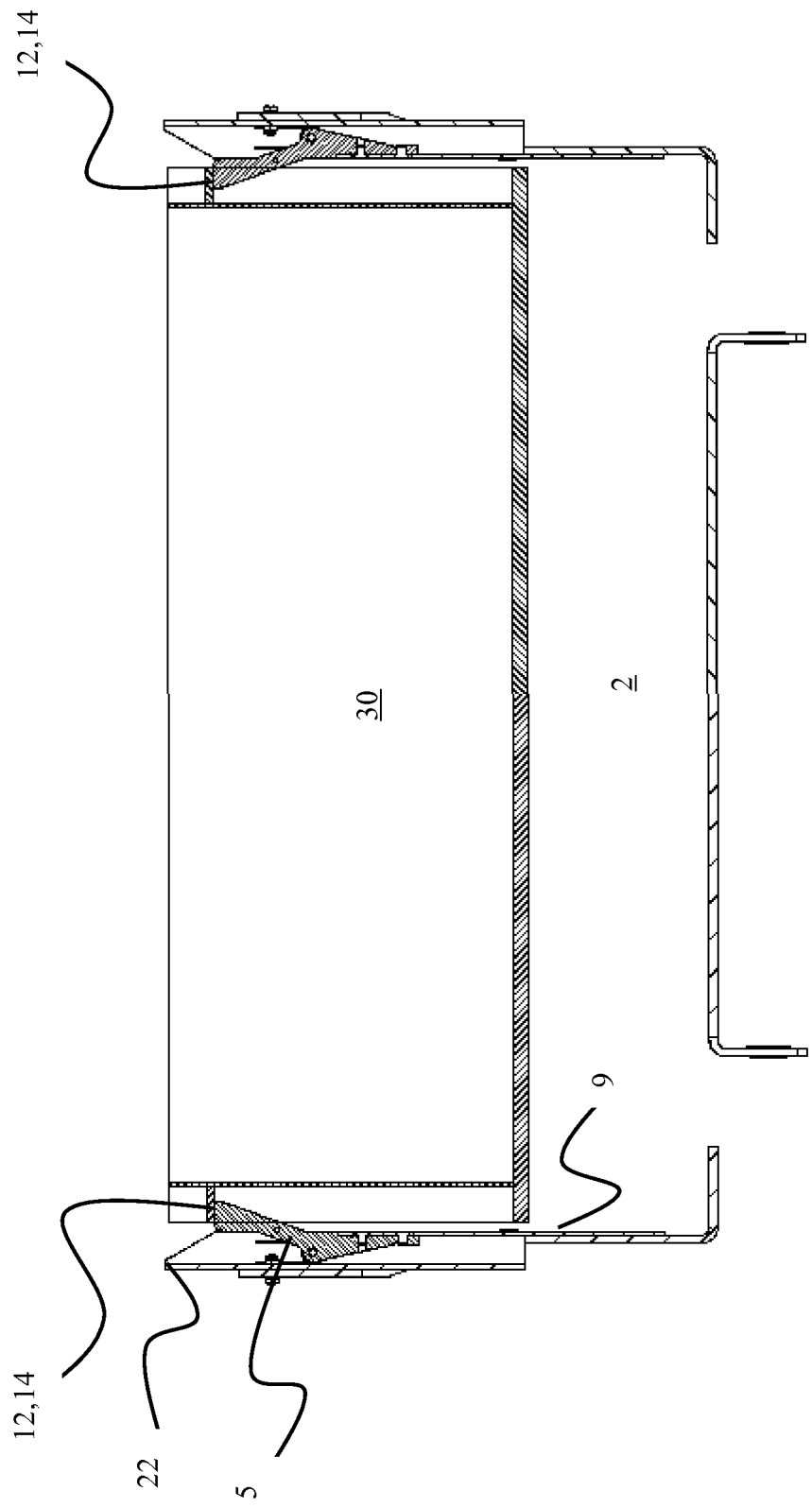
Fig. 5b (B-B)

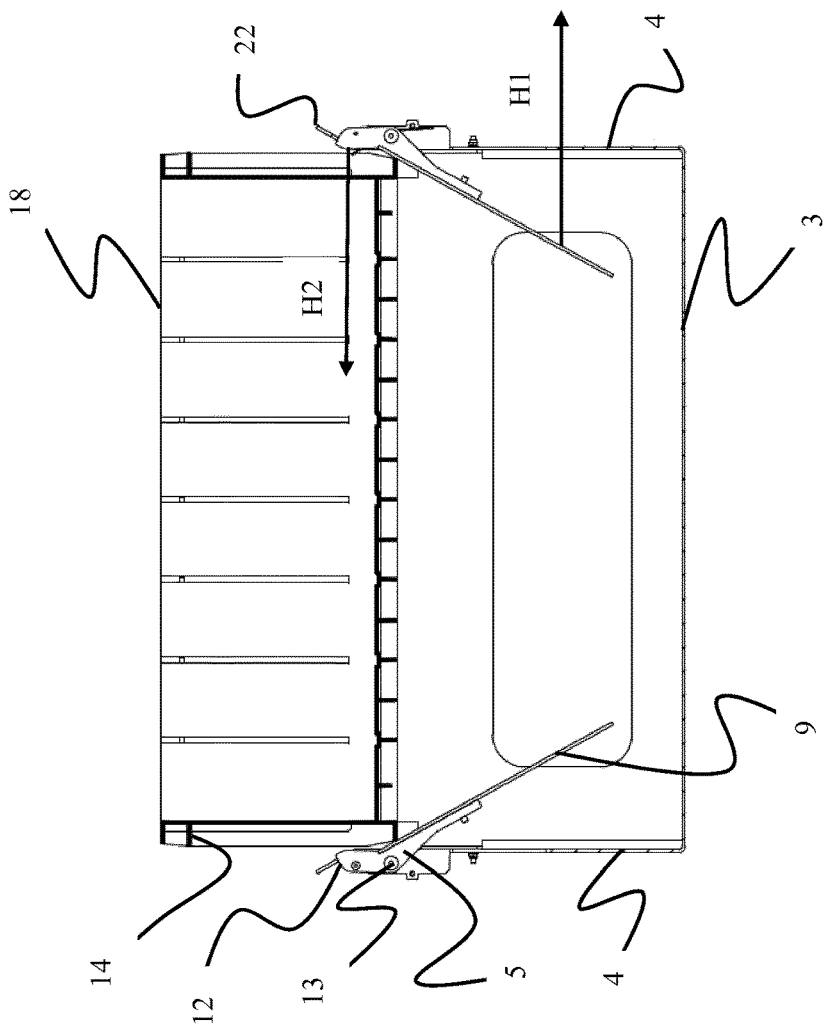
Fig. 9a (B-B)
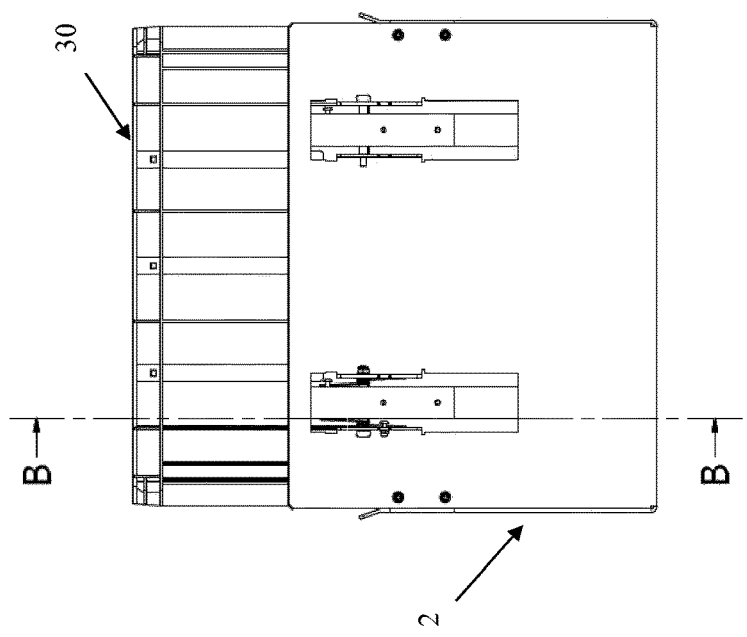
Fig. 8

BIN HOLDING DEVICE

TECHNICAL FIELD

The present invention relates to the field of storage systems, and more specifically to a picking/supply station for use in storage systems and a bin holding device for use in such picking/supply stations.

BACKGROUND

The Applicant's already known AutoStore system is a storage system comprising a three-dimensional storage grid structure wherein storage bins/containers are stacked on top of each other to a certain height. Such a prior art system is shown in FIG. 1a.

The storage system is disclosed in detail in for instance NO317366 and WO 2014/090684 A1.

The storage system 10 comprises a grid structure 20 constructed as aluminium columns interconnected by top rails. Between the columns, vertical compartments are defined, in which the storage bins 30 may be stacked vertically above each other. A number of vehicles 40, or robot vehicles, are arranged on the top rails and may move horizontally on top of the storage grid.

Each vehicle is equipped with a lifting device for picking up, carrying, and placing storage bins 30 that are stored in the storage grid.

The system also comprises picking and/or supply stations 60, where one or several product items are picked out from the storage bin 30 or where one or several product items are placed into the storage bin 30.

When a product item stored in a storage bin is to be picked from the storage grid, the robot vehicle is arranged to pick up the storage bin containing that product type and then transport it to a bin lift 50. The bin lift transports the storage bin to the picking and/or supply station 60, where the item of the product type is retrieved from the storage bin. The storage bin with the remaining product items is thereafter returned to the storage grid by means of a bin lift and a robot vehicle. The picking and/or supply station 60 illustrated in FIG. 1a is only shown schematically as a simple table upon which the storage bin is arranged. A more advanced prior art picking and/or supply station 60 illustrated in FIG. 1b.

The same procedure is used for supplying product items into the storage grid. First, items are supplied into a storage bin at a picking and/or supply station. The bin lift then lifts the storage bin up to the upper level where a robot vehicle transports the storage bin to its correct position within the storage grid.

A storage control and communication system is used to monitor inventory, to keep track of the location of respective storage bins (within storage grid and/or during transport), the content of each storage bins etc. Further, the storage control and communication system may also comprise, or may be provided in communication with, a control system for controlling the robot vehicles to pick a desired storage bin and to deliver it at the desired location at the desired time—without colliding with other vehicles.

The storage bins 30 have the same footprint and in most prior art systems are of the same height. To allow for increased storage flexibility it is desirable to have a storage system, wherein the storage bins may have different heights.

However, prior art picking and/or supply stations, also called work stations, designed for storage bins having a specific height, see FIG. 1b, are not suitable for use with a storage system comprising storage bins of different heights.

Such stations comprise an opening 1 for operator access to the storage bin 30. The top edge of the storage bin is arranged below the opening at substantially the same level to minimize any gap between said top edge and the circumference of the opening. This provides the operator with an ergonomic work position, keeping the bottom of the storage bin as close to the operator as possible, minimizes exposure of the station interior and minimizes the operator risk of squeeze/crush injuries.

An example of a prior art picking/supply station is disclosed in WO 2012/026824 A1. The exemplary prior art picking/supply station comprises box-shaped holding devices for receiving storage bins from a storage system. The holding devices are disclosed having stop devices to prevent a storage bin from sliding through the holding device. The stop devices are not further defined; however, from the drawings they appear to be multiple inclined arms interacting with corresponding recesses extending from the bottom of the storage bin.

The purpose of the present invention is to provide a picking/supply station suitable for storage bins of different heights.

SUMMARY OF THE INVENTION

The present invention is defined by the attached claims and in the following:

In a first aspect, the present invention provides a bin holding device comprising two vertical side elements spaced to accommodate a storage bin between them, and each side element provided with a bin supporting assembly comprising a bin support and an actuator, wherein the bin support comprises an upper bin interacting part arranged to interact with a storage bin accommodated in the bin holding device, such that a top edge of the accommodated storage bin is held at a predetermined level; and the actuator is operably connected to the bin support and comprises a lower bin interacting part arranged to interact with a storage bin during introduction into the bin holding device, such that the upper bin interacting part is moved to interact with the storage bin (e.g. when the lower bin interacting part interacts with a storage bin during introduction into the storage bin holding device, the bin support is moved from an inactive position, wherein the upper bin interacting part is not interacting with the storage bin being introduced, to an active position, wherein the upper bin interacting part interacts with the storage bin, such that the top edge of the storage bin is held at a predetermined level).

Preferably, the bin support is arranged to support/suspend a storage bin when the storage bin is accommodated in the bin holding device, such that a top edge of the accommodated storage bin is held at a predetermined level.

The predetermined level may be relative any part of equipment in which the bin holding device is used, such as an opening in a picking/supply station, or relative a base/bottom level of the bin holding device or relative an upper edge of the bin holding device 2.

In an embodiment of the bin holding device, the vertical side elements are plate-shaped and arranged in parallel vertical planes. The distance between the two side elements is suitable for accommodating a storage bin between them.

In an embodiment, the bin holding device comprises a base and the two vertical side elements are arranged on opposite sides, or side edges, of the base.

In an embodiment of the bin holding device, the vertical side elements are arranged to be parallel to two opposite side walls of an introduced storage bin.

In an embodiment of the bin holding device, the bin support is arranged to interact with an external edge or rib on a sidewall of the storage bin introduced into the storage bin holding device. Preferably, the bin support interacts with a downwards directed surface of the edge or rib. The edge or rib is preferably horizontal when the storage bin is in an upright position, i.e. when the storage bin is arranged on a horizontal surface. The edge or rib is preferably arranged at the upper half of the storage bin.

In an embodiment of the bin holding device, the lower bin interacting part is arranged to be displaced by a bottom, or lower, part of an introduced storage bin, preferably by a bottom edge.

In an embodiment of the bin holding device, the upper bin interacting part of the bin support is moved in a horizontal direction towards a storage bin being introduced when the lower bin interacting part of the actuator is displaced by the storage bin. Preferably, the lower bin interacting part of the actuator is displaced in a horizontal direction away from the storage bin.

In all embodiments, the bin holding device is arranged such that a storage bin must be introduced to the bin holding device in a downward vertical direction/movement.

In an embodiment of the bin holding device, the bin supporting assembly is pivotably connected to the side element, such that the upper bin interacting part of the bin support is arranged on the opposite side of a pivot point relative the lower bin interacting part of the actuator. The bin supporting assembly may also be defined as a lever, wherein one end of the lever comprises the bin support and the other end of the lever comprises the actuator.

In an embodiment of the bin holding device, the upper bin interacting part features a top, or upwards facing, surface for supporting a downwards facing surface on a sidewall of a storage bin. Alternatively, the upper bin interacting part may be defined as comprising a stop, i.e. the top surface, which engages a step on a side of the storage bin, i.e. the downwards facing surface on a sidewall of a storage bin, to suspend the bin within the bin holding device.

In an embodiment of the bin holding device, the lower bin interacting part is a flat arm.

In an embodiment of the bin holding device, each of the side elements is provided with two bin supporting assemblies. The two bin supporting assemblies are spaced such that an accommodated storage bin is balanced at the predetermined level.

In an embodiment of the bin holding device, the bin support is movable between an inactive position, wherein the upper bin interacting part is not interacting with a storage bin being introduced into the bin holding device, and an active position, wherein the upper bin interacting part interacts with a storage bin, such that the top edge of the storage bin is held at a predetermined level.

In an embodiment of the bin holding device, the actuator is able to move the bin support between an inactive position and an active position, wherein the bin supports of the two vertical side elements are closer to each other in the active position than in the inactive position.

In an embodiment of the bin holding device, the bin support and/or the upper bin interacting part is pretensioned, or biased, into a non-interacting, or inactive, position when the actuator and/or the lower bin interacting part, is not interacting with a storage bin, the bin support and/or the upper bin interacting part is preferably pretensioned/biased by a spring.

Alternatively, the bin holding device of the first aspect may be defined as comprising a bin support mounted on a pivot, the bin support comprising an actuating lever disposed at a lower end below the pivot for interacting with a lower portion of a bin, and a stop provided at an upper end above the pivot and displaceable about the pivot by the lever being pushed by the bin between an inactive (retracted) position where the lower portion of the bin is able to move past and an active (projecting) position where the stop is positioned to interact with and suspend the bin.

In a second aspect, the present invention provides a picking/supply station for receiving a storage bin from a storage system, comprising at least one bin holding device according to any of the embodiments of the first aspect, the bin holding device arranged to receive a storage bin from the storage system and transport the storage bin to a position for operator access to the storage bin.

In an embodiment of the picking/supply station, the position for operator access is below an opening in the picking/supply station and the at least one bin holding device is arranged such that a top edge of the storage bin is arranged at a predetermined level relative the opening.

In a third aspect, the present invention provides a storage system comprising a three-dimensional grid having multiple storage columns, in which storage bins are stored one on top of another in vertical stacks, and a picking/supply station according to the second aspect.

In a fourth aspect, the invention provides a method of arranging a top edge of a storage bin at a predetermined level in a bin holding device according to the first aspect, comprising the steps of:
  lowering the storage bin into the bin holding device;
  pushing a lower part of the storage bin against the lower bin interacting part provided on each of the vertical side elements, such that the upper bin interacting part of the operatively connected bin support moves towards a sidewall of the storage bin; and
  further lowering the storage bin until the upper bin interacting part supports a downwards facing surface on the sidewall, such that the top edge of the storage bin is held at the predetermined level.

In a preferred embodiment, the method comprises a step of lowering the lower part of the storage bin past the upper bin interacting part, before the lower part is pushed against the lower bin interacting part.

SHORT DESCRIPTION OF THE DRAWINGS

Embodiments of the invention will now be described in greater detail by way of example only and with reference to the following drawings:

FIG. 3 is a cross-sectional view along A-A of the picking/supply station in FIG. 2.

FIG. 4a is a topside view of a first embodiment of a bin holding device according to the invention.

FIG. 4b is an exploded perspective view of one of the bin supporting assemblies of the bin holding device in FIG. 4a.

FIGS. 5a and 5b are cross-sectional views along B-B of the bin holding device in FIG. 4a receiving a storage bin.

FIG. 8 is a side view of the bin holding device and storage bin in FIG. 7.

FIGS. 9a-9c are cross-sectional views along B-B of the bin holding device and storage bin in FIG. 8 showing the steps of introducing the storage bin into the device.

DETAILED DESCRIPTION OF THE INVENTION

Figure 1B:
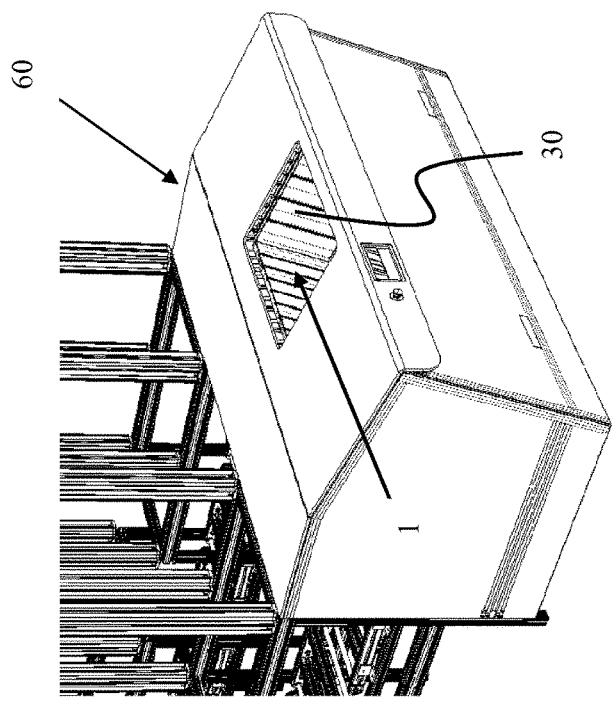
FIG. 1b is a perspective view of a prior art picking/supply station.
Figure 1A:
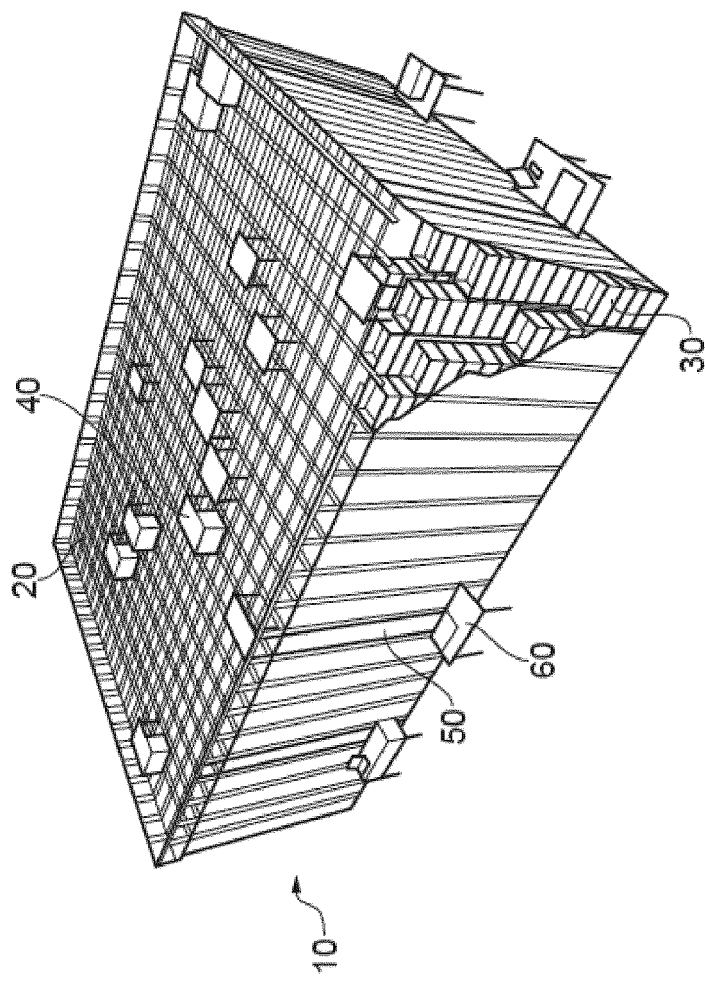
FIG. 1a is a perspective view of a prior art storage system.

The purpose of the present invention is to alleviate or avoid problems associated with the use of bins having different heights in a prior art storage system as shown in FIG. 1a.

Figure 2:
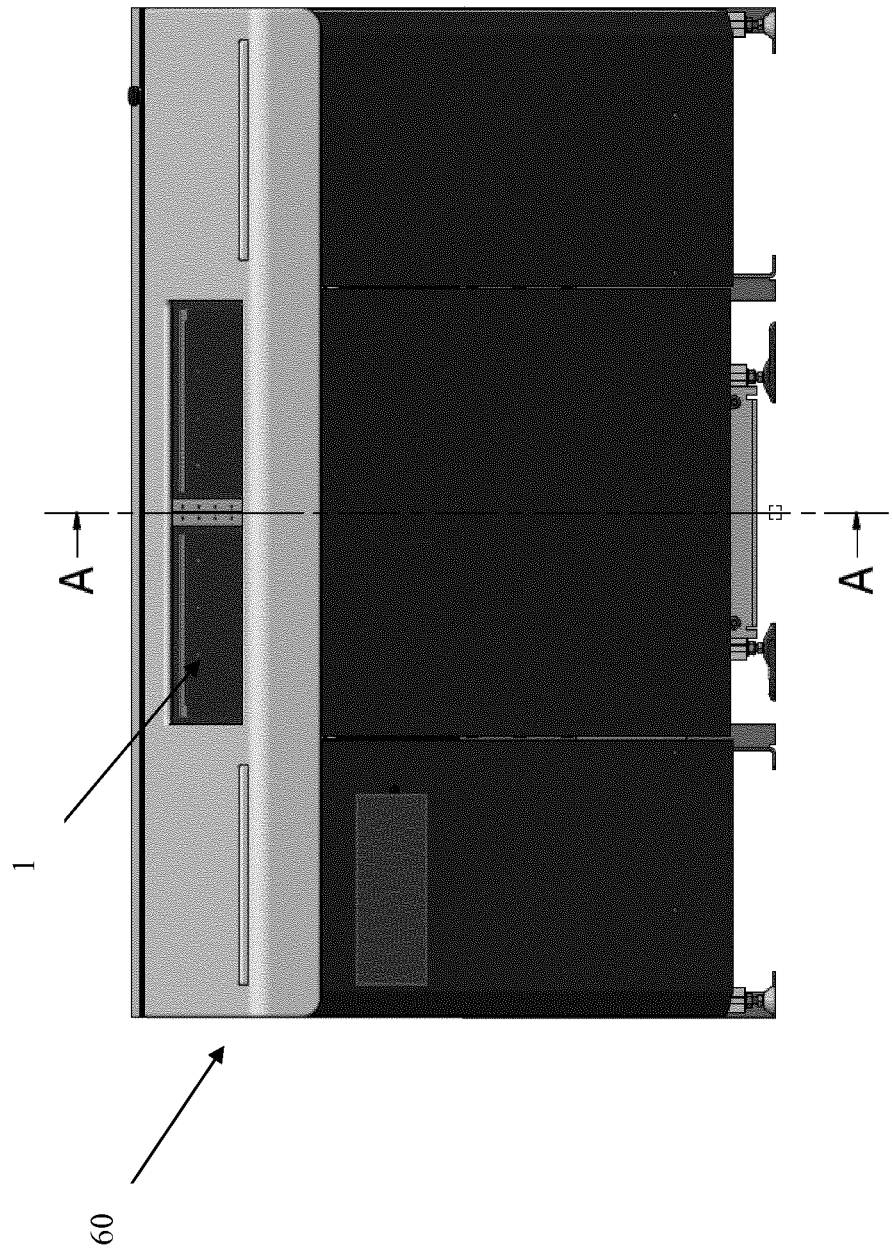
FIG. 2 is a front side view of an exemplary embodiment of a picking/supply station according to the invention.

An embodiment of a picking/supply station according to the invention is shown in FIG. 2. The main differential feature of the inventive station relative the prior art station disclosed in FIGS. 1b and 1n WO 2012/026824 is the feature of the storage bin holding devices 2 according to the invention. In the prior art stations, the bin holding devices (not shown in FIG. 1b and termed "holding devices" in WO 2012/026824) are not suitable for securely holding storage bins of different heights.

During use a storage bin 30', 30" is transferred from a storage system grid 20, for instance by use of a bin lift 50, to the port 19 in the picking/supply station 60, as best shown in FIG. 3. The storage bin is lowered onto/into a bin holding device 2 for subsequent transportation to a position below the access opening 1. In the illustrated picking/supply station 60 a maximum height storage bin 30' is shown below the port 19, while a shorter storage bin 30 is shown below the access opening 1. Due to the bin holding device 2 according to the invention, the top edge 18 of a storage bin will always be arranged at a predetermined level below the access opening 1 independent of the height of the storage bin. That is, the top edge 18 of the maximum height storage bin 30' and the top edge 18 of the shorter storage bin 30" will be arranged at the same predetermined level. The predetermined level may be relative the opening 19, relative a base/bottom level of the bin holding device 2 or relative an upper edge 22 of the bin holding device 2. It is of course a prerequisite that the height of the storage bins is equal to or less than a certain maximum value.

Figures 4A, 4B:
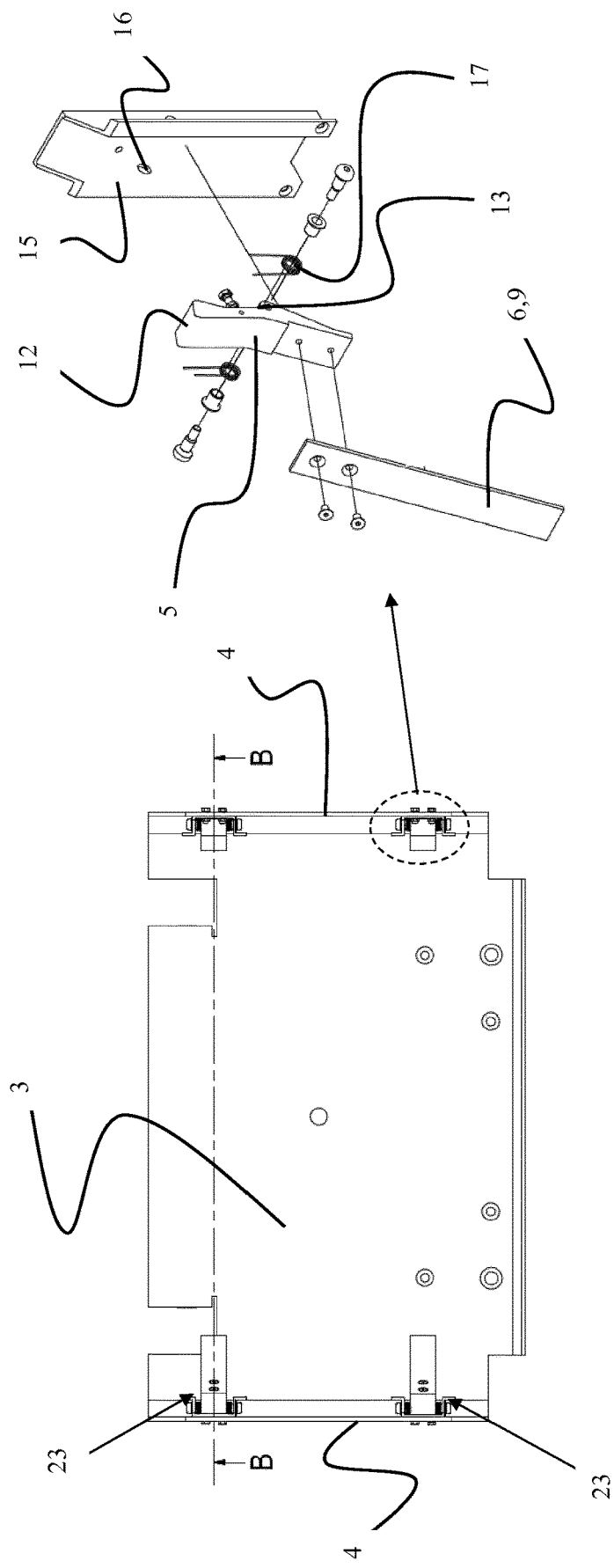

The bin holding device 2 shown in the picking/supply station in FIG. 3 is shown in detail in FIGS. 4a and 4b. The bin holding device 2 features a base plate 3 and two vertical side elements 4. The side elements 4 are arranged at opposite side edges of the base plate 3, and are spaced to accommodate a storage bin 30 between them. The base plate 3 is not an essential feature of the bin holding device 2 and may be replaced by any suitable structure suitable for holding the two side elements 4 in the required structural relationship, for instance a frame interconnecting the two side elements.

Each of the side elements 4 features two bin supporting assemblies 23 comprising a bin support element 5 (i.e. a bin support) and an actuator lever 6,9 (i.e. an actuator), see FIG. 4b. The bin supporting assembly is connected at the side element 4 via a bracket 15. The bracket features through holes 16 in which the supporting assembly is pivotably mounted.

The function of the bin holding device is explained by reference to FIGS. 5a and 5b, wherein the interaction between a storage bin and the bin holding device is illustrated. FIG. 5a shows the initial interaction when a storage bin is lowered onto the bin holding device, while FIG. 5b shows the final position of the storage bin relative the bin holding device.

A top surface 12 (i.e. an upper bin interacting part) of the bin support element 5 is arranged to interact with a downwards facing surface 14 of an external side edge 8 arranged on the sidewall 7 of the storage bin 30. By supporting the storage bin via the external side edge 8, a top edge 18 of the storage bin is always held at a predetermined level relative the base plate 3 of the device 2, provided the level of the surface 14 is kept constant relative the top edge 18 on all storage bins to be used with the bin holding device. In this manner the level of the top edge 18, when accommodated in the bin holding device, will be independent of the height of the storage bin. During introduction of the storage bin, a bottom edge 11 of the storage bin 30 will push the actuator levers 6, 9 in a horizontal direction (H1) away from the storage bin. Each of the actuator levers is pivotably connected (i.e. operably connected) to a corresponding bin support element 5 through a pivot 13, such that the horizontal movement (H1) of the actuator levers provides a similar and opposite direction movement (H2) of the top surface 12 of the bin support element 5 (i.e. the bin interacting part of the bin support element). The movement of the actuator levers causes the bin support elements 5 to be positioned such that the lower surface 14 of the edge 8 will rest upon the surfaces 12 of the bin support elements when fully accommodated in the bin holding device, see FIG. 5b. Each of the bin supporting assemblies is pretensioned/biased by a spring 17, see. FIG. 4b, such that the actuator levers 6, 9 return to their non-actuated position when the storage bin is lifted off, or out of, the bin holding device. The bin support element 5 is moved between an inactive position in FIG. 5a to an active position in FIG. 5b. In the active position, at least the top surfaces 12 of the bin support elements is moved closer to each other, or in other words, closer to the storage bin accommodated between the side elements.

Figure 7:
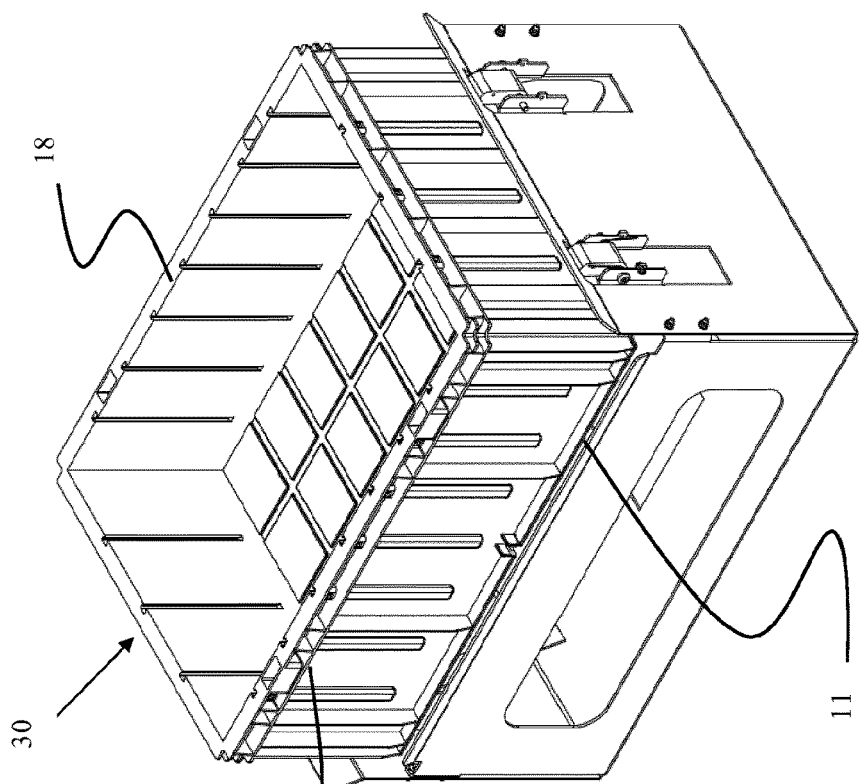
FIG. 7 is a perspective view of the bin holding device in FIG. 6 and a storage bin to be introduced into the device.
Figure 6:
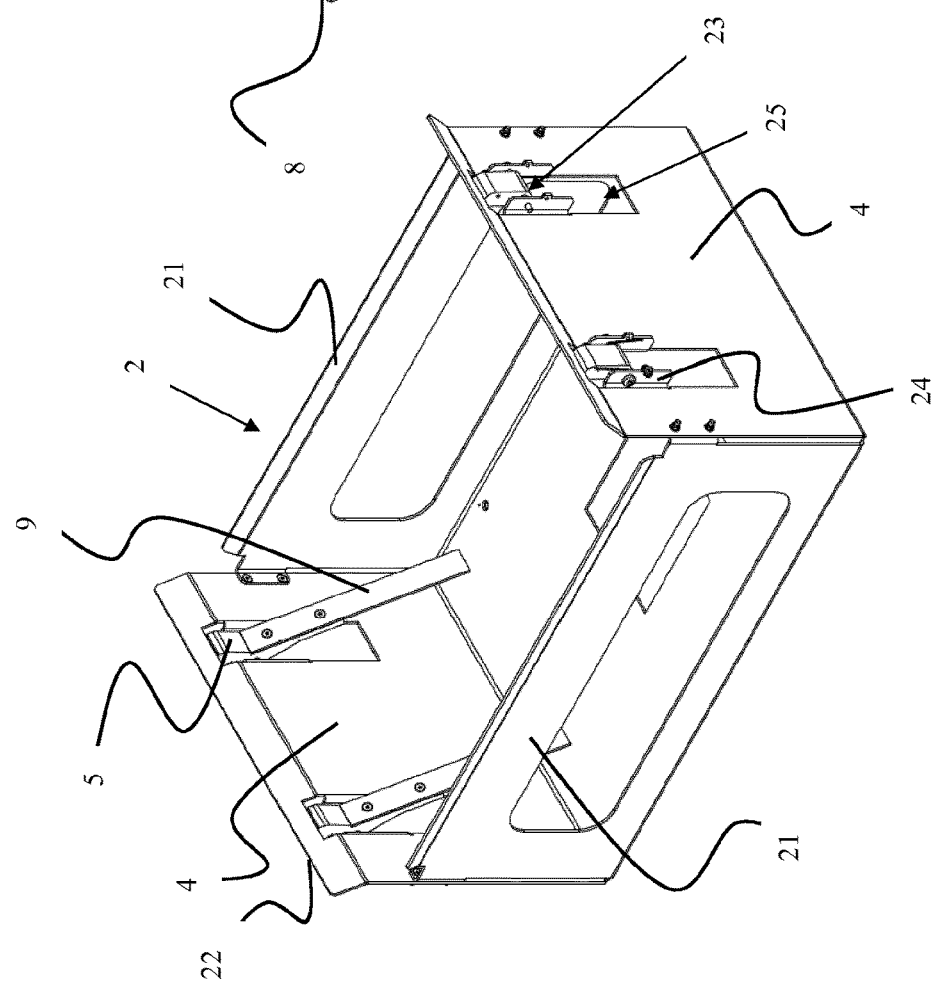
FIG. 6 is a perspective side view of a second embodiment of a bin holding device according to the invention.
Figure 9C:
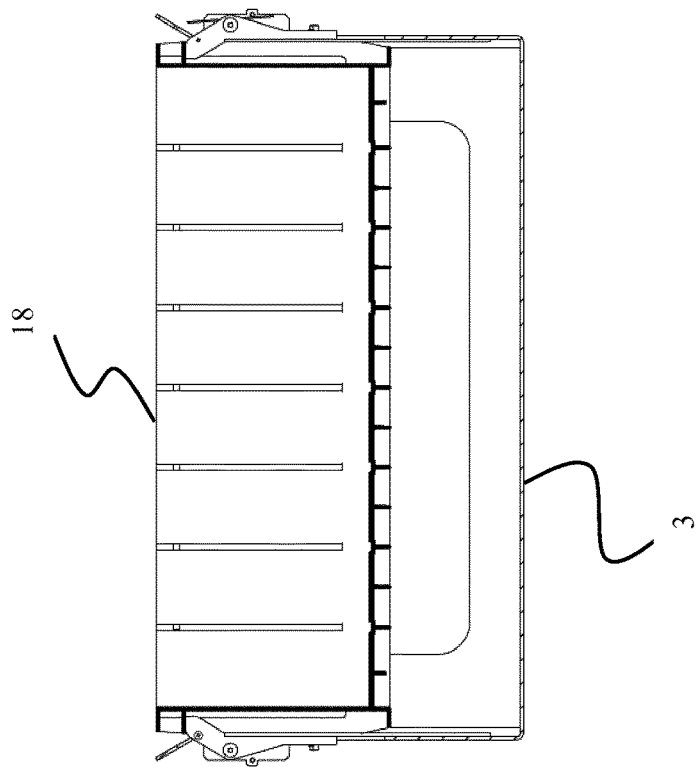
Figure 9B:
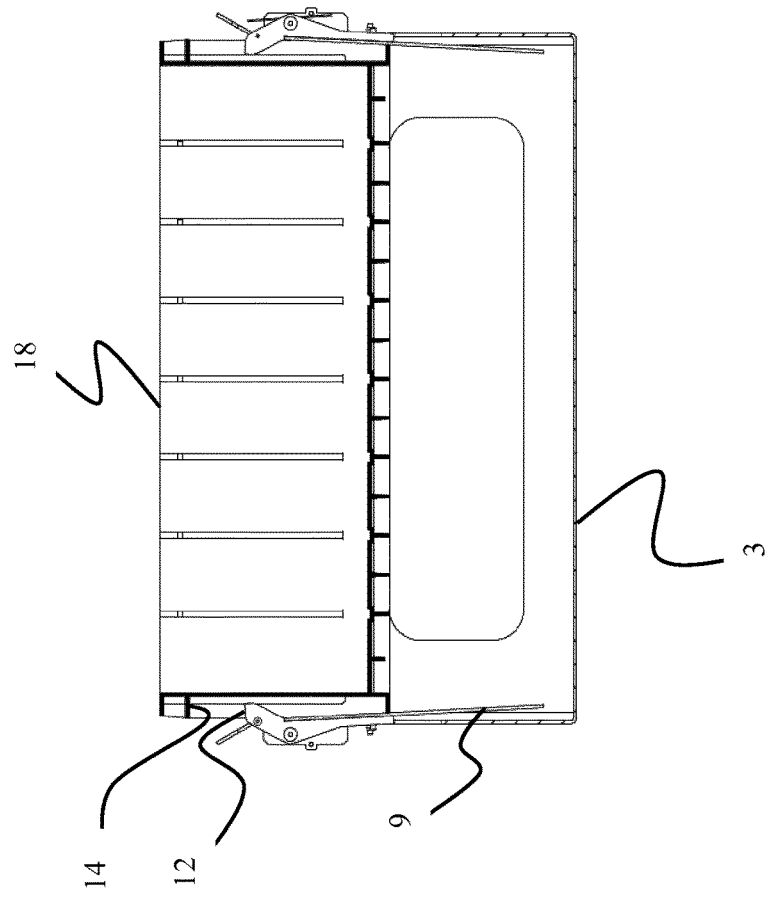

A second embodiment of a bin holding device is shown in FIG. 6. The main differentiating features of the second embodiment relative the first embodiment are a set of sidewalls 21, providing structural support to the vertical side elements 4, and the manner in which the bin supporting assemblies are mounted on the vertical side elements 4. In the second embodiment, the bin supporting assemblies are not mounted via a separate bracket 15, but through an integral bracket 24 formed by a cutout 25 in the vertical side element 4. The bin holding device 2 and a storage bin 30 to be introduced are shown in FIG. 7. The function of the bin holding device 2 is identical to the first embodiment described above and is illustrated in FIGS. 8 and 9a-9c using the same reference numbers for the same features.

The main advantage of the bin holding device 2 of the present invention is the ability to hold storage bins having a wide range of different heights at a predetermined vertical level.

In the disclosed embodiments, the bin supporting assemblies 23 comprises two interconnected elements, i.e. a bin support 5 element and an actuator 6. In other embodiments, the bin support 5 element and the actuator 6 may advantageously be made as a single element, for instance by molding the bin supporting assembly in one piece.

In the disclosed embodiments, each of the side elements 4 comprises two bin supporting assemblies. However, embodiments having side elements 4 comprising a single supporting assembly, wherein the bin support element is sufficient to balance/stabilize the supported storage bin is also contemplated. In these embodiments, the bin support element may for instance extend in a horizontal direction and comprise multiple spaced bin interacting parts (i.e. multiple top surfaces 12).

The inventive concept of the present invention is described in detail by reference to the two embodiments of a bin holding device above. In both embodiments, the bin support element is actuated by a pivotably connected lever mechanism. However, based on the present disclosure, the skilled person would be able to design similar actuator solutions. Any actuator solution that is able to interact with a storage bin being lowered into the bin holding device and transform said interaction into a horizontal movement of a bin support element towards the storage bin is considered to be encompassed by the present invention. The actuator may for instance be a hook element providing a downwards pull on a wire when interacting with the bottom part of a storage bin being introduced. The wire may be connected to the bin support element, for instance via a lever/pulley/pivot arm system etc., such that the bin support element moves in a horizontal direction towards the storage bin when the wire is pulled downwards. To allow for storage bins of different heights the wire may be elastic or the lever/pulley/pivot arm system may allow the wire/hook to travel further downwards after actuation of the bin support element.

The invention claimed is:

1. A bin holding device comprising two vertical side elements spaced to accommodate a storage bin between the two vertical side elements, each side element provided with a bin supporting assembly comprising a bin support and an actuator, wherein the bin support comprises an upper bin interacting part arranged to interact with the storage bin when the storage bin is accommodated in the bin holding device, such that a top edge of the accommodated storage bin is held at a predetermined level; and the actuator is operably connected to the bin support and comprises a lower bin interacting part arranged to interact with the storage bin during introduction of the storage bin into the bin holding device in a downward vertical direction, such that the upper bin interacting part is moved to interact with the storage bin.

2. A bin holding device according to claim 1, wherein the upper bin interacting part is arranged to interact with an external edge or rib on a sidewall of the storage bin accommodated in the storage bin holding device.

3. A bin holding device according to claim 1, wherein the lower bin interacting part is arranged to be displaced by a lower part of an introduced storage bin, preferably by a bottom edge.

4. A bin holding device according to claim 3, wherein the upper bin interacting part is arranged to be moved in a horizontal direction towards a storage bin being introduced when the lower bin interacting part is displaced by the storage bin.

5. A bin holding device according to claim 4, wherein the lower bin interacting part is displaced in a horizontal direction away from the storage bin during introduction of the storage bin.

6. A bin holding device according to claim 1, wherein the bin supporting assembly is pivotably connected to the side element, such that the upper bin interacting part is arranged on the opposite side of a pivot point relative the lower bin interacting part.

7. A bin holding device according to claim 4, wherein the upper bin interacting part features an upwards facing surface for supporting a downwards facing surface on a sidewall of a storage bin.

8. A bin holding device according to claim 3, wherein the lower bin interacting part is a flat arm.

9. A bin holding device according to claim 1, wherein each of the side elements is provided with two bin supporting assemblies.

10. A bin holding device according to claim 1, wherein bin support is biased into a non-interacting position when the actuator is not interacting with a storage bin, wherein the bin support is biased by a spring.

11. A bin holding device according to claim 1, wherein the vertical side elements are plate-shaped and arranged in parallel vertical planes.

12. A bin holding device according to claim 1, comprising a base, wherein the two vertical side elements are arranged on opposite sides of the base.

13. A bin holding device according to claim 1, wherein the vertical side elements are arranged to be parallel to two opposite sidewalls of an accommodated storage bin.

14. A picking/supply station for receiving a storage bin from a storage system, comprising at least one bin holding device according to claim 1, the bin holding device arranged to receive a storage bin from the storage system and transport the storage bin to a position for operator access to the storage bin.

15. A storage system comprising a three-dimensional grid having multiple storage columns, in which storage bins are stored one on top of another in vertical stacks, and a picking/supply station according to claim 14.

16. A method of arranging a top edge of a storage bin at a predetermined level in a bin holding device according to claim 1, comprising:

lowering the storage bin into the bin holding device;

pushing a lower part of the storage bin against the lower bin interacting part provided on each of the vertical side elements, such that the upper bin interacting part of the operatively connected bin support moves towards a sidewall of the storage bin; and further lowering the storage bin until the upper bin interacting part supports a downwards facing surface on the sidewall, such that the top edge of the storage bin is held at the predetermined level.

* * * * *